United States Patent
Wang et al.

(10) Patent No.: US 10,839,603 B2
(45) Date of Patent: *Nov. 17, 2020

(54) CREATING INTERACTIVE ZONES IN VIRTUAL ENVIRONMENTS

(71) Applicant: Microsoft Technology Licensing, LLC, Redmond, WA (US)

(72) Inventors: Yijie Wang, Bellevue, WA (US); Yangming Chong, Redmond, WA (US); Alexandru Octavian Balan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,846

(22) Filed: May 25, 2018

(65) Prior Publication Data

US 2019/0333275 A1 Oct. 31, 2019

Related U.S. Application Data

(60) Provisional application No. 62/664,469, filed on Apr. 30, 2018.

(51) Int. Cl.
*G06T 19/00* (2011.01)
*G06F 3/0481* (2013.01)
(Continued)

(52) U.S. Cl.
CPC ............ *G06T 19/006* (2013.01); *G06F 3/012* (2013.01); *G06T 7/20* (2013.01)

(58) Field of Classification Search
None
See application file for complete search history.

(56) References Cited

U.S. PATENT DOCUMENTS 8,947,455 B2    2/2015 Friesen
2005/0245302 A1* 11/2005 Bathiche ................. A63F 13/00
                                                                    463/1

(Continued)

FOREIGN PATENT DOCUMENTS

EP        2899618 A1    7/2015
WO    2015161307 A1   10/2015

OTHER PUBLICATIONS

"International Search Report and Written Opinion Issued in PCT Application No. PCT/US19/028424", dated Jul. 29, 2019, 14 Pages.
(Continued)

*Primary Examiner* — Michael J Cobb
(74) *Attorney, Agent, or Firm* — Alleman Hall Creasman & Tuttle LLP

(57) ABSTRACT

Interactive zones are created in a virtual environment by a head mounted display device executing a virtual reality application. The interactive zones correspond to physical objects that are external to the user such as keyboards, mice, notepads, cups, and other objects that the user may desire to interact with. Each interactive zone includes real time video of the corresponding object so that the user can easily interact with the object, and view their interaction with the object, while still participating in the virtual reality application. If the user moves one of the physical objects, the corresponding interactive zone is also moved in the virtual environment.

17 Claims, 9 Drawing Sheets

(51) Int. Cl.
*G06F 3/01* (2006.01)
*G06T 7/20* (2017.01)

(56) References Cited

U.S. PATENT DOCUMENTS

| | | |
|---|---|---|
| 2006/0241792 A1 | 10/2006 | Pretlove et al. |
| 2012/0249416 A1* | 10/2012 | Maciocci ................ G06F 3/011 |
| | | 345/156 |
| 2013/0321462 A1 | 12/2013 | Salter et al. |
| 2015/0269783 A1* | 9/2015 | Yun .................... G02B 27/0172 |
| | | 345/633 |
| 2017/0045941 A1 | 2/2017 | Tokubo et al. |
| 2017/0061696 A1 | 3/2017 | Li et al. |
| 2018/0005421 A1 | 1/2018 | Park et al. |
| 2018/0095542 A1 | 4/2018 | Mallinson |
| 2018/0173323 A1* | 6/2018 | Harvey .................. G06F 3/011 |
| 2018/0260032 A1 | 9/2018 | Norieda et al. |
| 2019/0213793 A1* | 7/2019 | Balan ..................... G06T 19/003 |
| 2019/0285867 A1* | 9/2019 | Huang ............... G02B 27/0179 |
| 2020/0074741 A1* | 3/2020 | Schulze .................. A63F 13/26 |

OTHER PUBLICATIONS

"International Search Report and Written Opinion Issued in PCT Application No. PCT/US2018/066099", dated Apr. 24, 2019, 12 Pages.

"Non Final Office Action Issued in U.S. Appl. No. 15/886,764", dated May 29, 2019, 10 Pages.

"Notice of Allowance Issued in U.S. Appl. No. 15/886,764", dated Sep. 23, 2019, 9 Pages.

\* cited by examiner

CREATING INTERACTIVE ZONES IN VIRTUAL ENVIRONMENTS

CLAIM OF PRIORITY

This application claims priority to U.S. Provisional Application No. 62/664,469 filed Apr. 30, 2018, the contents of which are hereby incorporated by reference in their entirety.

BACKGROUND

Users of Virtual Reality ("VR") applications are able to interact with virtual objects that are rendered into a virtual environment by a head mounted display ("HMD") device. Typically, while a user wears the HMD device, the true environment of the user is completely replaced with the virtual environment to give the user a truly immersive experience.

While such sensory immersion may result in a better VR experience, there are drawbacks. For some VR applications, it may be desirable for the user to be able to interact with some physical objects in their environment while using the VR application. For example, a user may desire to use a mouse on their desk while participating in a VR application, or may desire to take written notes about their experience on a notepad. However, because the mouse and notepad do not exist in the virtual environment, it may be difficult for the user to interact with the mouse and notepad using touch alone. Similar issues may be associated with joysticks, keyboards, or other input means. In another example, a user may desire to eat or drink while using the VR application, but may be discouraged because the desired food or beverages are not visible in the virtual environment.

SUMMARY

A user wears an HMD device and participates in a VR application where the user is able to interact with virtual objects in a virtual environment. To allow the user to continue to interact with the real world while participating in the VR application, one or more cameras associated with the HMD device capture video data surrounding the HMD device. This video data represents what the user would see were they not participating in the VR application. One or more physical objects in the video data that the user may desire to interact with are identified such as a keyboard, a mouse, a phone, a notepad, a glass, etc.

For one or more of these identified physical objects, an interactive zone is created and displayed to the user in the VR application. These interactive zones are placed to appear in approximately the same location to the user in the virtual environment as they would appear to the user were they not wearing the HMD device. In each of the interactive zones, a video feed is rendered and displayed to the user in the virtual environment. Each video feed for an interactive zone shows a real time view of the physical object associated with the interactive zone allowing the user to see the physical object and interact with the object in the real world while still participating in the VR application. As the user moves and interacts with a physical object, the position or location of the physical object is tracked and the associated interactive zone is moved in the virtual environment according to the movement of the physical object.

In an implementation, a system for creating interactive zones in a virtual environment is provided. The system includes a head mounted display device and an interactive zone engine. The interactive zone engine: renders and displays a virtual environment to a wearer of the head mounted display device; captures video data corresponding to a field of view of the wearer of the head mounted display device; detects at least one physical object in the captured video data; creates an interactive zone in the virtual environment based on the detected at least one physical object; generates a video stream for the interactive zone from the captured video data; and renders and displays the generated video stream in the created interactive zone in the virtual environment.

In an implementation, a system for creating interactive zones in a virtual environment is provided. The system includes a head mounted display device and an interactive zone engine. The interactive zone engine: renders and displays a virtual environment to a wearer of the head mounted display device; captures video data corresponding to a field of view of the wearer of the head mounted display device; detects a first physical object in the captured video data; based on the detected first physical object in the captured video data, detects a physical plane in the captured video data; based on the detected physical plane, detects a second physical object in the captured video data, wherein the detected second physical object lies on the detected physical plane; renders and displays a virtual plane in the virtual environment based on the detected physical plane; and creates an interactive zone on the virtual plane in the virtual environment, wherein a location of the interactive zone on the virtual plane is based on the first physical object or the second physical object.

In an implementation, a method for creating interactive zones in a virtual environment is provided. The method includes: rendering and displaying a virtual environment to a wearer by a head mounted display device; capturing video data corresponding to a field of view of the wearer by the head mounted display device; receiving an indication to create an interactive zone by the head mounted display device; in response to the indication, creating the interactive zone in the virtual environment by the head mounted display device, wherein the interactive zone is associated with a location in the virtual environment; generating a video stream for the interactive zone from the captured video data by the head mounted display device, wherein the video stream for the interactive zone includes real time video from a location in the field of view that corresponds to the location associated with the interactive zone; and rendering and displaying the generated video stream in the created interactive zone in the virtual environment by the head mounted display device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
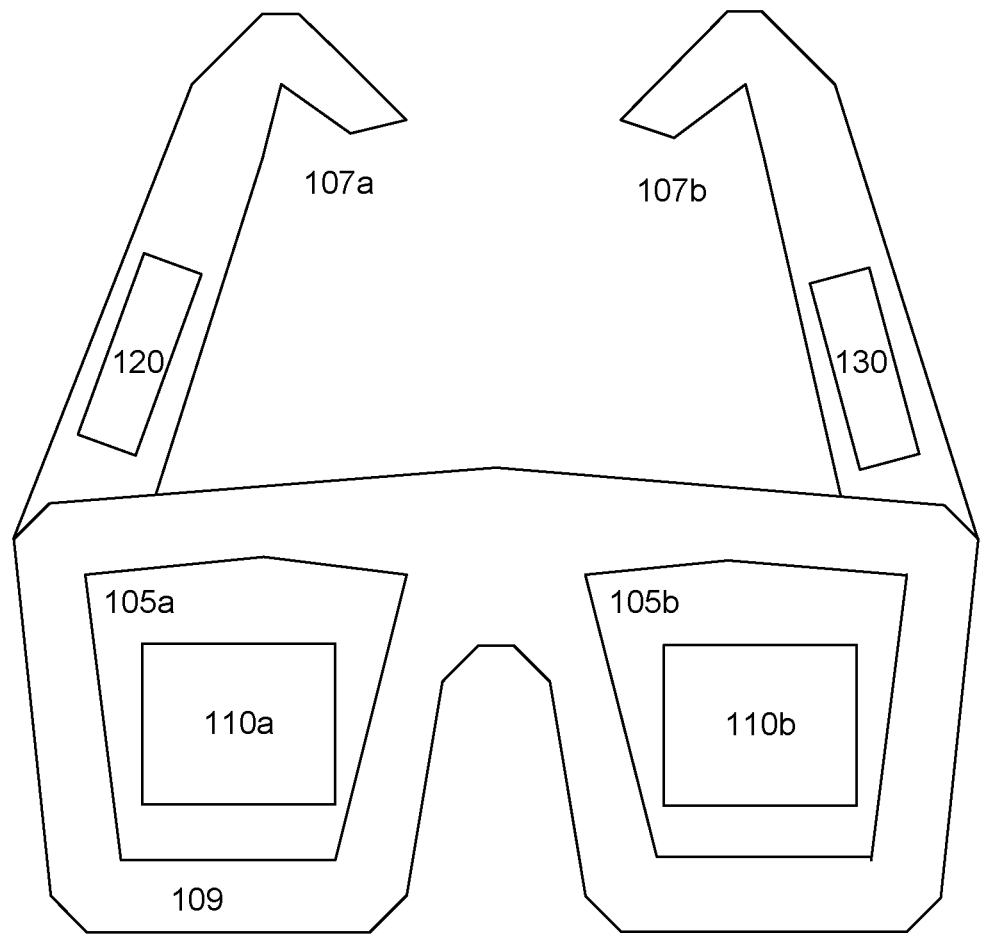
FIG. 1 is an illustration of an example head mounted display device.
Figure 9:
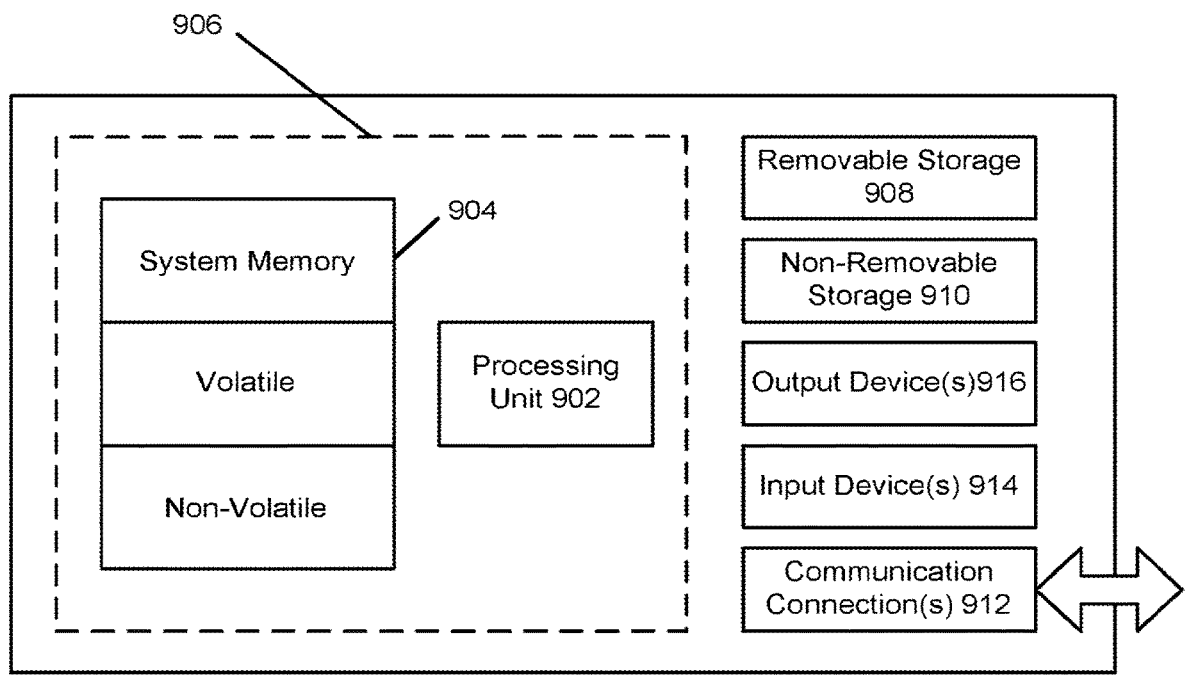
FIG. 9 shows an exemplary computing environment in which example embodiments and aspects may be implemented.

FIG. 1 is an illustration of an example HMD device 100. In an implementation, the HMD device 100 is a pair of glasses. The HMD device 100 includes lenses 105a and 105b arranged within a frame 109. The frame 109 is connected to a pair of temples 107a and 107b. Arranged between each of the lenses 105 and a wearer or user's eyes is a near eye display system 110. The system 110a is arranged in front of a right eye and behind the lens 105a. The system 110b is arranged in front of a left eye and behind the lens 105b. The HMD device 100 also includes a controller 120 and one or more sensors 130. The controller 120 may be a computing device operatively coupled to both near eye display systems 110a and 110b and to the sensors 130. A suitable computing device is illustrated in FIG. 9 as the computing device 900.

The sensors 130 may be arranged in any suitable location on the HMD device 100. They may include a gyroscope or other inertial sensors, a global-positioning system ("GPS") receiver, and/or a barometric pressure sensor configured for altimetry. The sensors 130 may provide data on the wearer's location or orientation. From the integrated responses of the sensors 130, the controller 120 may track the movement of the HMD device 100 within the wearer's environment.

The sensors 130 may include one or more cameras. The cameras may be configured to acquire video of the surroundings sighted by the wearer. The video may include depth video and may be used to establish the wearer's location, what the wearer sees, etc. The video data may be received by the controller 120, and the controller 120 may be configured to process the video received. The optical axis of the camera may be aligned parallel to, or close to, a line of sight of the wearer of the HMD device 100, such that the camera acquires video of the external imagery sighted by the wearer. The nature and number of the cameras may differ in the various embodiments of this disclosure. The one or more cameras may be configured to provide video from which a time resolved sequence of three dimensional depth map may be obtained via downstream processing The controller 120 may control the internal componentry of the near eye display systems 110a and 110b to form a desired image frame. In an implementation, the controller 120 may cause the near eye display systems 110a and 110b to display approximately the same image frame concurrently, so that the wearer's right and left eyes receive the same image frame at approximately the same time. In other implementations, the near eye display systems 110a and 110b may project somewhat different image frames concurrently, so that the wearer perceives a stereoscopic, i.e., three-dimensional, image frame.

In some implementations, the computer-generated image frames and various real images of objects sighted through the near eye display systems 110a and 110b may occupy different focal planes. Accordingly, the wearer observing a real world object may shift their corneal focus to resolve the image frame. In other implementations, the image frame and at least one real image may share a common focal plane.

No aspect of FIG. 1 is intended to be limiting in any sense, for numerous variants are contemplated as well. In some embodiments, for example, a vision system separate from the HMD device 100 may be used to acquire video of what the wearer sees. In some embodiments, a single near eye display system 110 extending over both eyes may be used instead of the dual monocular near eye display systems 110a and 110b shown in FIG. 1.

The HMD device 100 may be configured to run one or more VR applications. A VR application may create a virtual environment that is displayed to the user of HMD device 100. While participating in a VR application, the user of the HMD device 100 is able to "look around" the virtual environment, move around in it, and interact with one or more virtual objects. In some implementations, one or more VR applications may run on the controller 120 of the HMD device 100, and others may run on an external computer accessible to the HMD device 100 via one or more wired or wireless communication links. Accordingly, the HMD device 100 may include suitable wireless componentry, such as Wi-Fi.

As described above, one drawback associated with VR applications is that while the user is participating in the VR application, and wearing the HMD device 100, the user is unable to see objects in the real world because the VR environment completely replaces the real world environment of the user. This may make interacting with these objects difficult for the user. For example, a user may desire to drink from a cup while taking part in the VR application, but the user may be prevented from seeing the cup while wearing the HMD device 100. In another example, a user may desire to periodically view their smartphone to check for notifications, but may similarly be prevented from seeing their smartphone by the HMD device 100. Such limitations may force the user to exit the VR application or remove the HMD device 100 when the user desires to drink from the cup or use their smartphone, which may result in a poor VR experience for the user.

Figure 2:
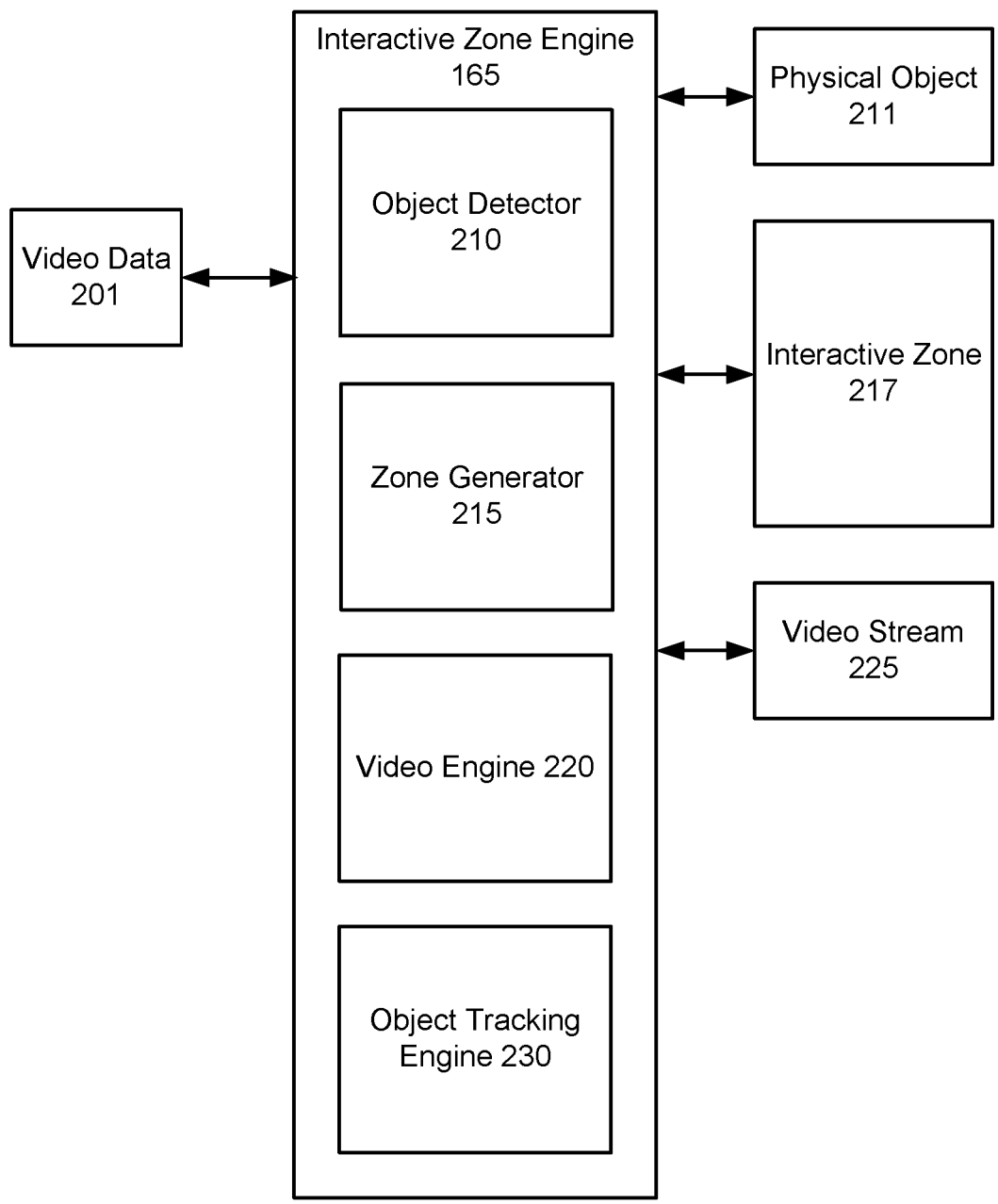
FIG. 2 is an illustration of an exemplary interactive zone engine.

To solve the problem noted above, FIG. 2 is an illustration of an exemplary interactive zone engine 165. The interactive zone engine 165 may create and render one or more interactive zones 217 into the virtual environment being viewed by the user through the HMD device 100. As described further below, an interactive zone 217 may be a "bridge" between the real world surrounding the user of the HMD device 100 and the VR environment rendered and displayed to the user by the HMD device 100. Each interactive zone 217 may display a portion of real time video collected by one or more cameras of the HMD device 100. The portion of video may be of a physical object 211 (e.g., keyboard, coffee cup, or mouse) that would be in the field of view of the user of the HMD device 100 if the user was not participating in the VR application.

When the user desires to interact with the physical object 211 associated with the interactive zone 217, the user can look at the video displayed in the interactive zone 217 in the virtual environment. Because the video is real time (or near real time), the user can also view their hands in the interactive zone 217 as they interact with the physical object 211 allowing for complex activities such as notetaking or operating a mouse. Each interactive zone 217 may further change locations in the virtual environment to match any changes that the user makes to the location of the associated physical object 211 in the real world.

As shown, the interactive zone engine 165 may comprise one or more components including an object detector 210, a zone generator 215, a video engine 220, and an object tracking engine 230. More or fewer components may be included in the interactive zone engine 165. Some or all of the components of the interactive zone engine 165 may be implemented by one or more computing devices such as the computing device 900 described with respect to FIG. 9. In addition, some or all of the functionality attributed to the interactive zone engine 165 may be performed by the HMD device 100, or some combination of the HMD device 100 and the interactive zone engine 165.

The object detector 210 may receive video data 201 and may detect one or more physical objects 211 in the video data 201. The video data 201 may be provided by one or more cameras associated with the HMD device 100. The video data 201 may capture what would be visible to the user (i.e., the field of view of the user) if the user was not participating in a VR application. Any method for capturing video data 201 may be used.

In some implementations, the object detector 210 may detect physical objects 211 in the video data 201 that the user is likely to interact with during the VR application. These may include physical objects 211 such as input devices (e.g., keyboards, joysticks, mice, motion controllers, etc.), computing devices (e.g., smartphones, tablets, laptops, portable video game devices, etc.), and food and beverage items (e.g., sandwiches, fruit, mugs, glasses, etc.). The physical objects 211 may further include items such as pens, pencils, and notepads, for example.

As may be appreciated, the object detector 210 may ignore physical objects 211 that may be visible in the video data 201 that the user is unlikely to interact with during the VR application. These may include objects such as vases, pictures, art, flowers, paperweights, staplers, etc., for example.

The object detector 210 may detect physical objects 211 using machine learning. For example, a model may be trained to identify physical objects 211 such as keyboards, mice, and notepads. Any method for machine learning may be used.

Depending on the implementation, the object detector 210 may be configured to identify what is referred to herein as a reference physical object 211 in the video data 201. The reference physical object 211 may be a physical object 211 such as a keyboard. Typically, users center their workspaces around a keyboard. Accordingly, a user may place other physical objects 211 that they are likely to interact with such as a mouse or a coffee cup near the keyboard. Once the object detector 210 has located the keyboard in the video data 201, it can limit its search for other physical objects 211 to an area that is proximate to the keyboard, or can create an interactive zone 217 at or around the keyboard. Other reference physical objects 211 may be supported.

The object detector 210 may identify the reference physical object 211 using machine learning. Alternatively or additionally, the reference physical object 211 may be designed or configured to be easily recognizable to the object detector 210. For example, a keyboard target physical object 211 may be colored or decorated with markings such as text, logos, or QR codes that make the keyboard recognizable to the object detector 210. In another example, the keyboard target physical object 211 may emit a signal using Bluetooth, Wi-Fi, or another technology that may be received by the object detector 210 and may be used to detect the physical object 211 in the video data 201. The signals and/or markings may be used by the object detector 210 to determine the make and model of the keyboard, which may help the object detector 210 locate the keyboard in the video data 201, and optionally render and display a model of the keyboard in the virtual environment.

In some implementations, the object detector 210 may use the reference physical object 211 to determine a plane where the physical objects 211 that the user is likely to interact with are located, or to determine a depth of the plane. The determined plane may represent a desk or table associated with the user, for example. For example, for a reference physical object 211 such a keyboard, the user is likely to place physical objects 211 that they may interact with on the same desk or table as the keyboard, and not on a shelf or other surface in their field of view. Once the object detector 210 determines a plane associated with the keyboard, it can limit its search for physical objects 211 in the video data to physical objects 211 that are on the same plane as the keyboard. In addition, once the depth of the plane has been determined, an interactive zone 217 may be placed at an equivalent depth in the virtual environment. As described further below, the determined plane can also be used to render a virtual plane in the virtual environment to further help orient the user. Any method for detecting a plane in video data 201 may be used.

The zone generator 215 may generate an interactive zone 217 for one or more of the physical objects 211. Depending on the implementation, each generated interactive zone 217 may have a fixed size, or may have a size that is based on the size of the associated physical object 211. Alternatively or additionally, the size of the interactive zone 217 may be set by the user.

The zone generator 215 may place each interactive zone 217 into the virtual environment being rendered and displayed to the user by the HMD device 100. The zone engine 215 may place each interactive zone 217 at a location, depth, and orientation in the virtual environment that is based on the location, depth, and orientation of the associated physical object 211 in the video data 201 and/or the field of view of the user. For example, if a physical object 211 such as a mouse would be visible to the user at a location in their field of view that is down and to the right, the interactive zone 217 may be placed in the virtual environment at a location that is down and to the right. The location, depth, and orientation of the physical object 211 may be determined using the cameras or other sensors associated with the HMD device 100.

By making the interactive zone 217 appear at the same location, depth, and orientation in the virtual environment where the user would expect the corresponding physical object 211 to appear in the real world, the user may be better able to interact with the physical object 211 while participating in the VR application. The size and shape of the interactive zone 217 may further be skewed or resized to reflect the perspective of the user in the virtual environment to further orient the user. Any method for matching locations, depths, and orientations between the real world and a virtual environment may be used.

In some implementations, the zone generator 215 may place an interactive zone 217 so that it is centered about the associated physical object 211 so that it can be used to view the entire physical object 211. For example, an interactive zone 217 meant to show an object 211 such as a coffee cup may be placed and/or sized such that the user can view some or all of the coffee cup. Alternatively, the zone generator 215 may place the interactive zone 217 adjacent to the physical object 211. For example, for a reference object such as a keyboard the zone generator 215 may place the interactive zone 217 to the right (or to the left) of the location of the keyboard. In this way, the user can manually place a desired object 211 such as a mouse or coffee cup into the interactive zone 217 when desired.

The user or wearer of the HMD device 100 may determine when and which interactive zones 217 are rendered and displayed in the virtual environment. In an implementation, when the VR application is initiated, the zone generator 215 may notify or alert the user to the physical objects 211 that were detected and may ask the user to indicate which interactive zones 217 they would like created. Alternatively, one or more interactive zones 217 may be automatically created based on user preference or based on user history.

For example, when the VR application is initiated, the object detector 210 may detect physical objects 211 in the field of view of the user or on a desk associated with the user. The zone generator 215 may ask the user which physical objects 211 would they like to have interactive zones 217 created for.

In another implementation, the zone generator 215 may create interactive zones 217 only when prompted or indicated by the user. For example, the user may say "Show my mouse." In response, the object detector 210 may locate a mouse object 211 in the video data 201, and the zone generator 215 may create and display a corresponding interactive zone 217 in the virtual environment based on the location of the mouse object 211.

The user may selectively enable and disable interactive zones 217. In some implementations, the user may enable or disable interactive zones 217 using voice commands or by pressing a button. For example, the user may press a button on a joystick that enables an interactive zone 217 associated with a keyboard or mouse, or may open a menu item in the VR application that is associated with text entry.

In other implementations, the user may enable or disable the interactive zones 217 by interacting with the associated physical objects 211. For example, if the user approaches their soda can, the zone generator 215 may detect the approach using the cameras associated with the HMD device 100, and in response may enable and display the associated interactive zone 217. The interactive zone 217 may be disabled after the user stops interacting with object 211 for a period of time, or if the user removes the object 211 from the determined plane or field of view.

The video engine 220 may generate a video stream 225 for each of the interactive zones 217. The video engine 220 may generate the video stream 225 from the video data 201 for an interactive zone 217 based on the location of the interactive zone 217 in the virtual environment, the size of the interactive zone 217, and the depth of the associated physical object 211 (e.g., the depth of the determined plane). The video engine 220 may further process (e.g., skew or rotate) the video stream 225 based on the perspective or the orientation of the user with respect to the virtual environment. The perspective and the of the user may be determined based on one or more sensors associated with the HMD device 100, for example.

The video stream 225 may be a real time (or substantially real time) video of or around the associated physical object 211. The resolution and frame rate of the video stream 225 may be selected by the user or may be based on the processing capabilities of the HMD device 100. The resolution and frame rate may be sufficient for the user to see any associated object 211 that is placed in the interactive zone 217 and to interact with the associated object 211 in the interactive zone 217. The video engine 220 may select the video for the video stream 225 such that the video is taken from a location in the field of view of the wearer of the HMD device 100 that corresponds to the location of the interactive zone 217 in the virtual environment. Any method for generating a video stream 225 may be used.

The object tracking engine 230 may track the locations of the physical objects 211, may determine changes in the locations of the physical objects 211, and may change the locations of the associated interactive zones 217 based on the determined changes. For example, the physical object 211 may be a keyboard, and the interactive zone 217 may be to the right of the keyboard. If the object tracking engine 230 determines that keyboard has been rotated 45 degrees by the user, the object tracking engine 230 may also rotate the corresponding interactive zone 217 by the same amount.

The object tracking engine 230 may further determine if the tracked object has been removed from the determined plane, or is no longer visible in the video data 201 (i.e., is not in the field of view of the user). In response to such a determination, the object tracking engine 230 may automatically remove the corresponding interactive zone 217 from the virtual environment, or may ask the user if they would like the interactive zone 217 removed from the virtual environment.

Figure 3:
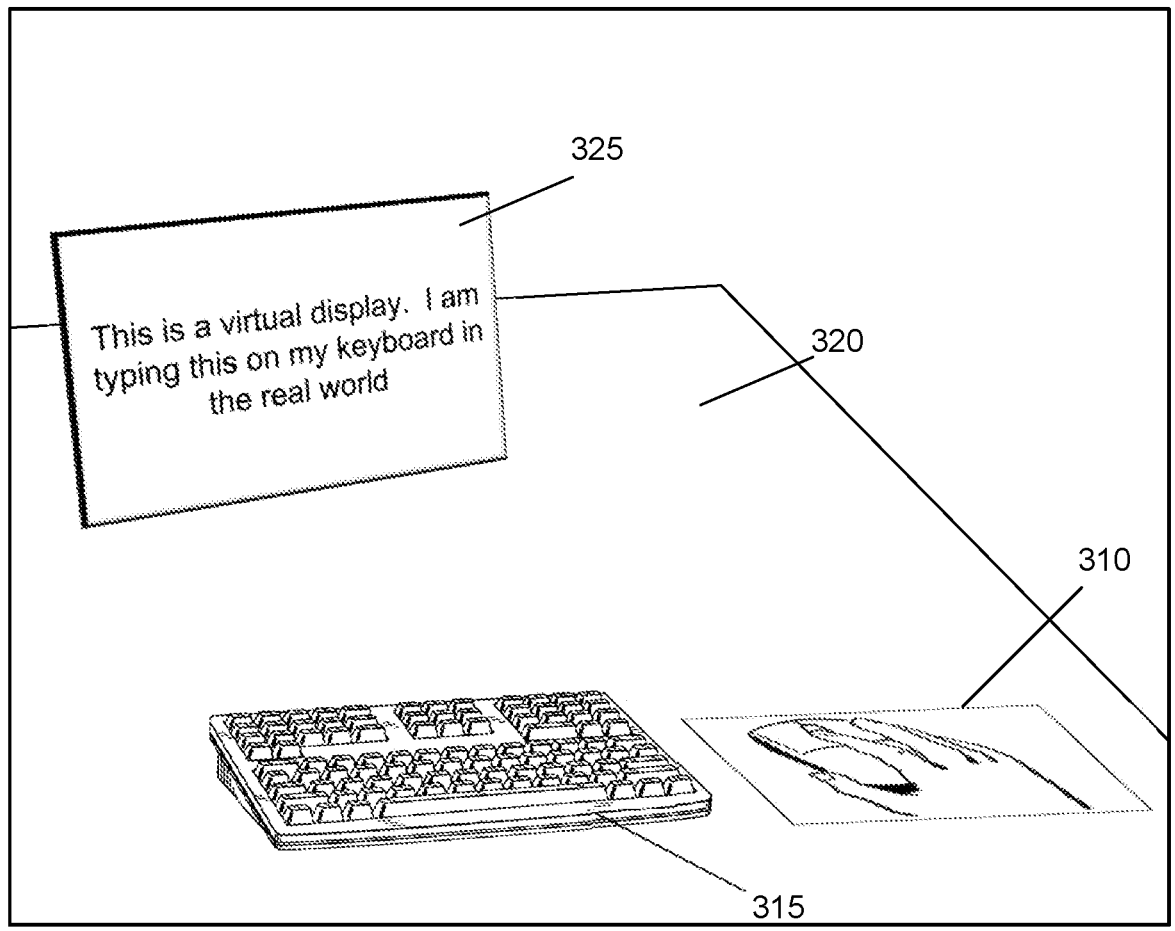
FIGS. 3-5 are illustrations of an example virtual environment including an interactive zone.

FIG. 3 is an illustration of an example virtual environment 300 corresponding to a VR application showing one or more interactive zones 217. A user may be participating in a VR application and may be wearing an HMD device 100. In the example, a table 320 has been rendered in the VR environment 300. The table 320 may be a virtual plane and may be based on an actual table or desk that is in front of the user, and would be visible to the user if the user was not wearing the HMD device 100 or participating in the VR application. The table 320 may have been determined and rendered by the interactive zone engine 165 based on video data 201 collected by one or more cameras associated with the HMD device 100.

Also shown in the environment 300 is a keyboard 315. The keyboard 315 may be a rendering of an actual keyboard found in the video data 201 by the interactive zone engine 165. Depending on the implementation, the depth and location of the table 320 in the environment 300 may be based on the depth and location of the keyboard 315 in the video data 201.

As the user types on the actual or real world keyboard, the entered text is displayed to the user on a virtual display 325. In this way the user may participate in one or more productivity applications while remaining in the virtual environment.

Also shown in the environment 300 is the interactive zone 310. The interactive zone 310 may have been placed in the environment 300 at a location and depth that is based on the keyboard 315. The interactive zone engine 165, upon detecting the keyboard 315, may have asked the user if the user wanted the interactive zone 310 to be placed adjacent to the keyboard 315. The user may have selected that the interactive zone 310 appear to the right of the keyboard 315 because the user is right handed. The size and shape of the interactive zone 310 may also have been selected or specified by the user.

As can be seen, the interactive zone 310 displays a video stream 225. In the example shown, the video stream 225 shows the hand of the user operating a mouse. Because the video stream 225 is near real time, the user can use the video stream 225 to orient themselves and to interact with the mouse while remaining in the virtual environment and using one or more productivity applications.

Figure 4:
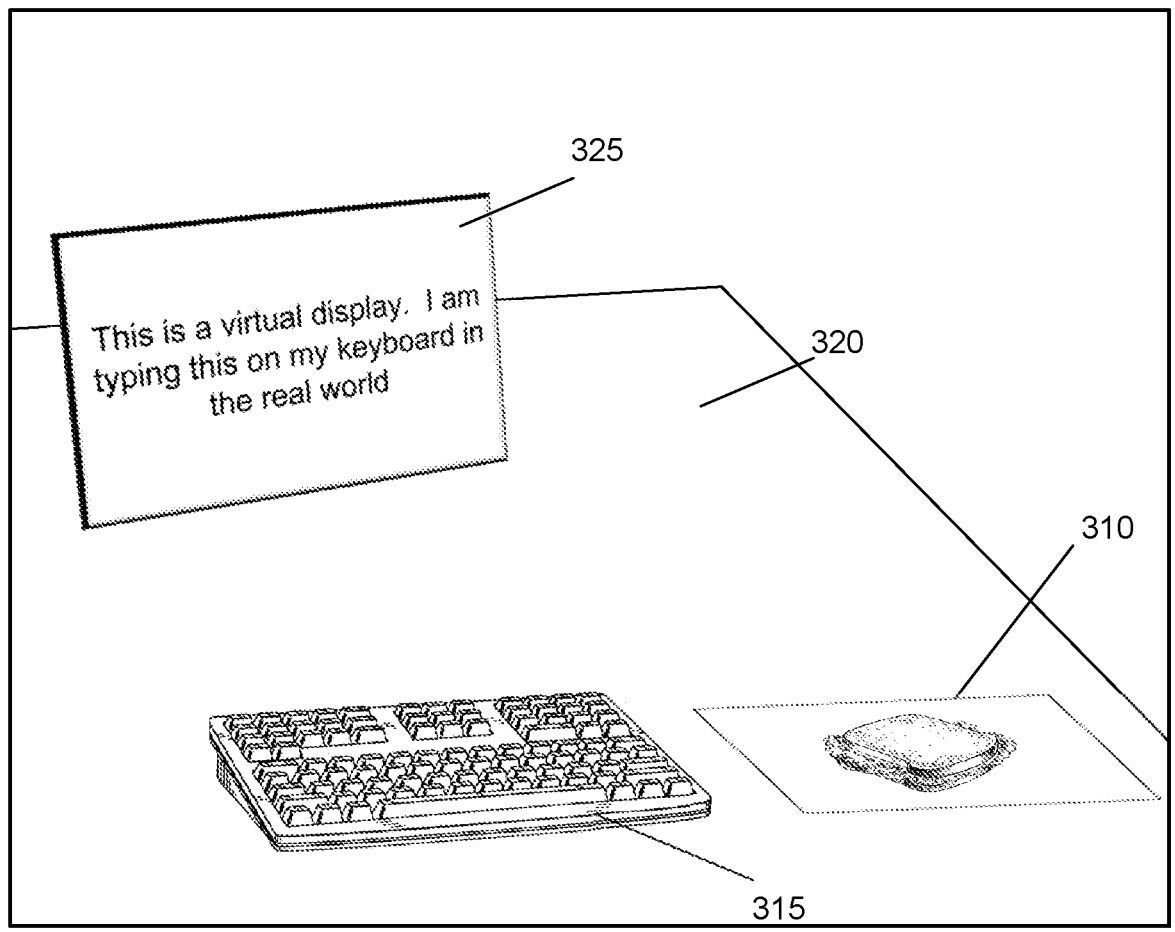

Continuing to FIG. 4, the user has moved the mouse out of the interactive zone 310, and has replaced it with a sandwich. Because of the corresponding video stream 225, the user is able to interact with and eat the sandwich even while remaining in the virtual environment.

Figure 5:
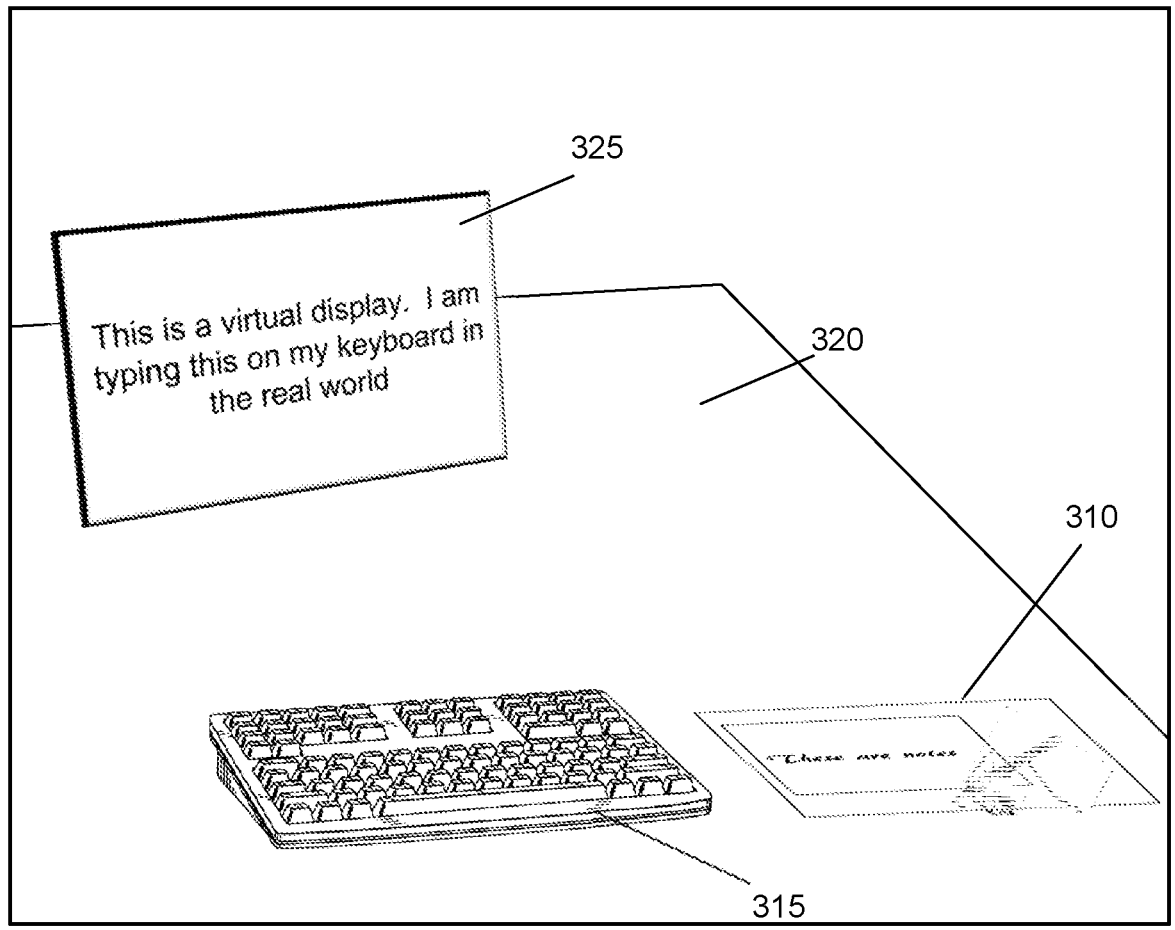

Continuing to FIG. 5, the user has replaced the sandwich in the interactive zone 310 with a notepad. Because of the corresponding video stream 225, the user is able to write on the notepad, and read back what is written. Such note taking would be difficult or near impossible for a user of a VR application before the interactive zone engine 165.

Figure 6:
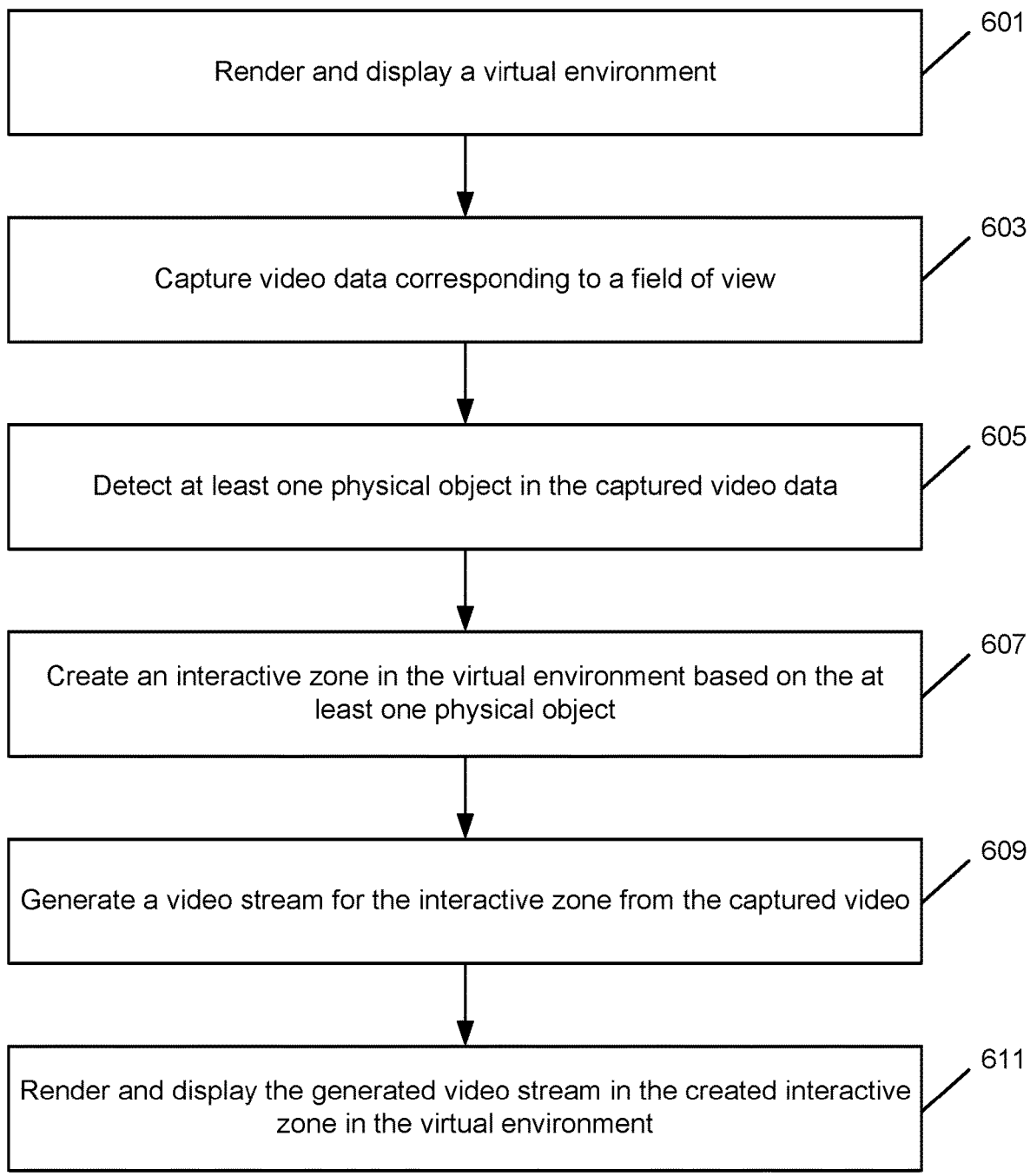
FIG. 6 is an operational flow of an implementation of a method for creating an interactive zone.

FIG. 6 is an operational flow of an implementation of a method 600 for creating an interactive zone 217. The method 600 may be implemented by one or both of an HMD device 100 and an interactive zone engine 165.

At 601, a virtual environment is rendered and displayed. The virtual environment may be rendered and displayed to a user (i.e., wearer) of the HMD device 100. The virtual environment may be part of a VR application. The virtual environment may include one or more virtual objects. While the user is wearing the HMD device 100 and participating in the VR application, the physical or real world may not be visible to the user.

At 603, video data corresponding to a field of view is captured. The video data 201 may be captured by one or more cameras associated with the HMD device 100. The video data 201 may represent what the user of the HMD device 100 would see in their field of view if they were not participating in the VR application and wearing the HMD device 100.

At 605, at least one physical object is detected in the captured video data. The at least one physical object 211 may be detected by the object detector 210 of the interactive zone engine 165. The at least one physical object 211 may be an object that the user of the HMD device 100 may desire to interact with while participating in the VR application such as a keyboard, a phone, a mouse, a beverage, or a notepad. Other types of objects 211 may be detected. The at least one physical object 211 may be located on a desk or table near the user. Any method for detecting objects 211 in video data 201 may be used. Depending on the implementation, the objects 211 may be detected when the user begins participating in the VR application, or may be detected in response to a user indication or selection.

At 607, an interactive zone is created in the virtual environment. The interactive zone 217 may be created in the virtual environment by the zone generator 215 of the interactive zone engine 165. The interactive zone 217 may be based on the at least one physical object 211. The interactive zone 217 may have a location in the virtual environment that is equivalent to the location of the at least one physical object 211 in the field of view of the user. Alternatively, the interactive zone 217 may have a location in the virtual environment that is close to the location of the at least one physical object 211 in the field of view of the user. For example, an interactive zone 217 may appear adjacent to an object 211 such as a keyboard. The size of the interactive zone 217 may be based on the size of the associated at least one physical object 211, or may be specified by the user.

Depending on the implementation, the object tracking engine 230 may track the orientation and location of the associated physical object 211 in the video data 201 and the field of view of the user. If a change in orientation or location is detected, the location and the orientation of the interactive zone 217 may be similarly changed in the virtual environment.

At 609, a video stream is generated for the interactive zone from the captured video data. The video stream 225 may be generated by the video engine 220 of the interactive zone engine 165 from the video data 201. The video stream 225 may be a portion of the video data 201 with a location in the field of view of the user that is equivalent to the location of the interactive zone 217 in the virtual environment.

At 611, the generated video stream is rendered and displayed in the created interactive zone in the virtual environment. The generated video stream 225 may be rendered and displayed by the video engine 220 of the interactive zone engine 165. Depending on the implementation, the video stream 225 may be displayed in response to the user interacting with the associated physical object 211 (e.g., in response to the user touching the object 211 or picking up the object 211), or may be displayed in response to a user command or selection. The video stream 225 may remain displayed until the user stops interacting with the object 211, until the user requests that the video stream 225 be closed, or until the user removes the associated object 211 from the field of view or video data 201.

Figure 7:
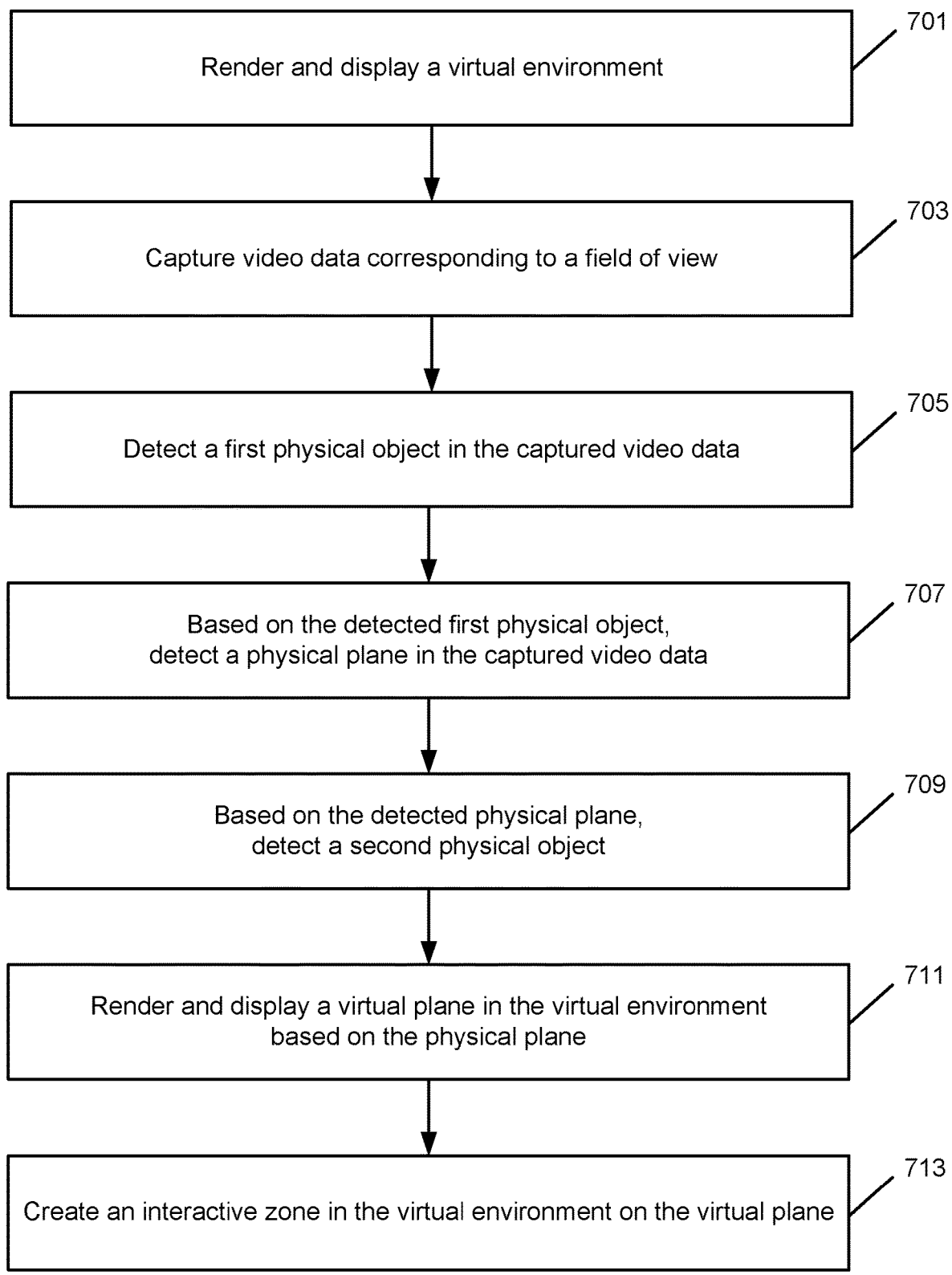
FIG. 7 is an operational flow of an implementation of a method for creating an interactive zone in a virtual environment on a virtual plane.

FIG. 7 is an operational flow of an implementation of a method 700 for creating an interactive zone 217 in a virtual environment on a virtual plane. The method 700 may be implemented by one or both of an HMD device 100 and an interactive zone engine 165.

At 701, a virtual environment is rendered and displayed. The virtual environment may be rendered and displayed to a user (e.g., wearer) of the HMD device 100. The virtual environment may be part of a VR application. While the user is wearing the HMD device 100 and participating in the VR application, the physical or real world may not be visible to the user.

At 703, video data corresponding to a field of view is captured. The video data 201 may be captured by one or more cameras associated with the HMD device 100. The video data 201 may represent what the user of the HMD device 100 would see in their field of view if they were not participating in the VR application and wearing the HMD device 100.

At 705, a first physical object is detected in the captured video data. The first physical object 211 may be detected by the object detector 210 of the interactive zone engine 165. The first physical object 211 may be a target or reference object 211 such as a keyboard. Depending on the implementation, the first physical object 211 may be detected when the user begins participating in the VR application, or may be detected in response to a user request or indication.

At 707, a physical plane is detected in the captured video data. The physical plane may be detected in the video data 201 based on the first physical object 211 by the object detector 210 of the interactive zone engine 165. The physical plane may be determined to be located at a depth that is directly below the first physical object 211. The physical plane may be a table, desk, or other surface associated with the user of the HMD device 100. Other methods for detecting a physical plane in video data 201 may be used.

At 709, a second physical object is detected. The second physical object 211 may be detected by the object detector 210 of the interactive zone engine 165. The second physical object 211 may be detected by detecting objects 211 that are located on the detected physical plane, or by detecting objects 211 that have the same depth of as the physical plane or the first physical object 211.

At 711, a virtual plane is rendered and displayed in the virtual environment. The virtual plane may be rendered and displayed by the interactive zone engine 165 based on the detected physical plane. The virtual plane may be rendered and displayed to appear to the user at approximately the same depth and location in the virtual environment as the physical plane would appear to the user in the real world environment. The overall size, shape, and appearance of the virtual plane may be specified by the user.

At 713, an interactive zone is created in the virtual environment. The interactive zone 217 may be created in the virtual environment on the virtual plane by the zone generator 215 of the interactive zone engine 165. The interactive zone 217 may be based on the first physical object 217 or the second physical object 217. The interactive zone 217 may appear to rest on the virtual plane in the virtual environment and may be located in the virtual environment at or around the same location as the first physical object 217 or the second physical object 217 in the field of view of the user.

Figure 8:
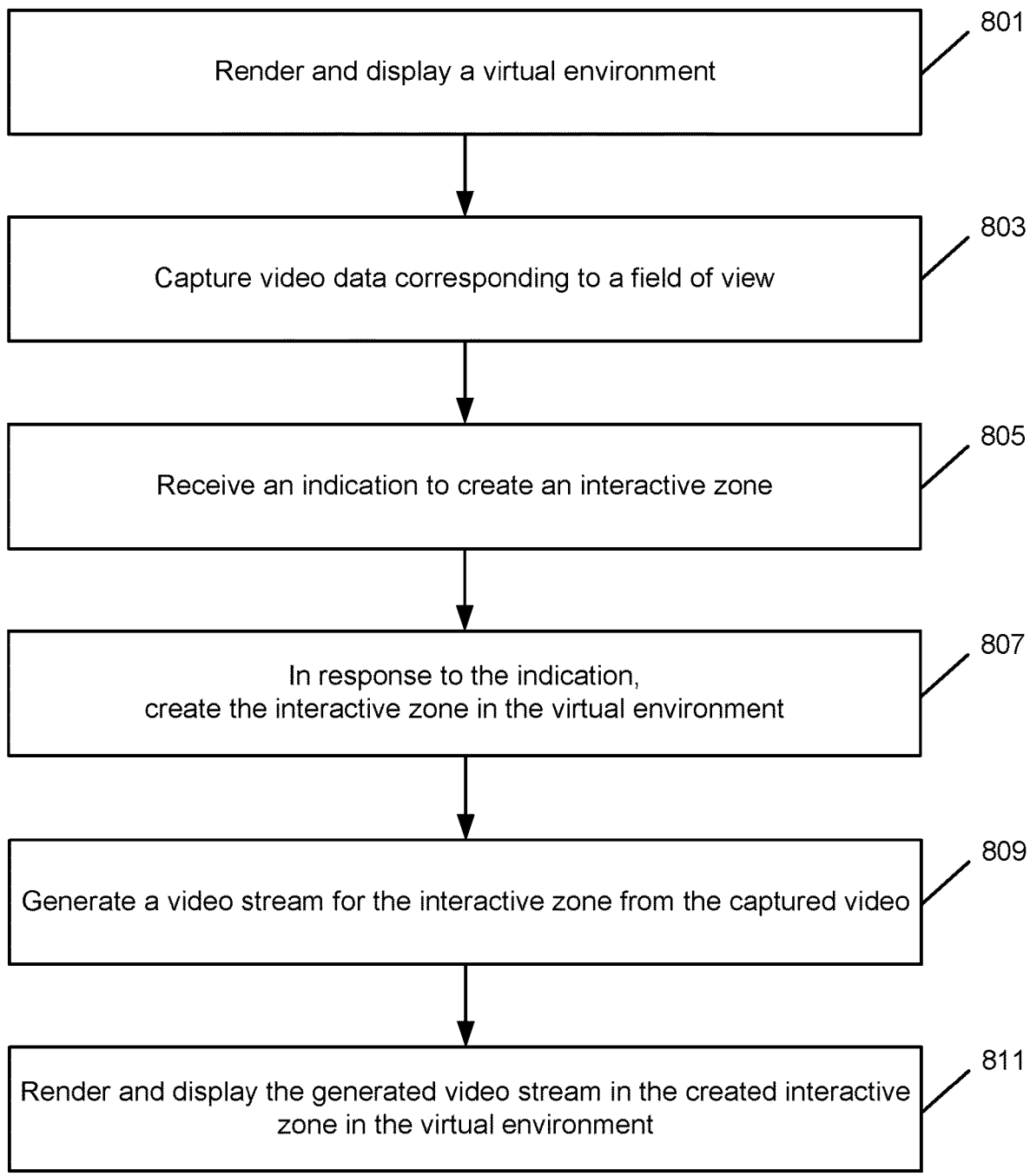
FIG. 8 is an operational flow of an implementation of a method for creating an interactive zone in response to an indication.

FIG. 8 is an operational flow of an implementation of a method 800 for creating an interactive zone 217 in response to an indication. The method 800 may be implemented by one or both of a HMD device 100 and an interactive zone engine 165.

At 801, a virtual environment is rendered and displayed. The virtual environment may be rendered and displayed to a user (i.e., wearer) of the HMD device 100. The virtual environment may be part of a VR application. The virtual environment may include one or more virtual objects. While the user is wearing the HMD device 100 and participating in the VR application, the physical or real world may not be visible to the user.

At 803, video data corresponding to a field of view is captured. The video data 201 may be captured by one or more cameras associated with the HMD device 100. The video data 201 may represent what the user of the HMD device 100 would see in their field of view if they were not participating in the VR application and wearing the HMD device 100.

At 805, an indication to create an interactive zone is received. The indication may be received by the interactive zone engine 165. The indication may be an instruction received from the user. For example, the user may speak a command such as "Turn on the interactive zone" or "Show my mouse." In another example, the user may press a button on the HMD device 100. Other types of indications may be used.

At 807, an interactive zone is created in the virtual environment. The interactive zone 217 may be created in the virtual environment by the zone generator 215 of the interactive zone engine 165. Depending on the implementation, the interactive zone engine 165 may first locate a reference physical object 211 (e.g., a keyboard) in the video data 201, and may create the interactive zone 217 at or around the equivalent location in the virtual environment. The size and location of the interactive zone 217 relative to the reference physical object 211 may be specified by a user or an administrator. The location of the target physical object 211 in the video data 201 may be continuously tracked by the object tracking engine 230, and if a change is detected, the location of the interactive zone 217 in the virtual environment may also be changed.

At 809, a video stream is generated for the interactive zone from the captured video data. The video stream 225 may be generated by the video engine 220 of the interactive zone engine 165 from the video data 201. The video stream 225 may be a portion of the video data 201 with a location in the field of view of the user that is equivalent to the location of the interactive zone 217 in the virtual environment.

At 811, the generated video stream is rendered and displayed in the created interactive zone in the virtual environment. The generated video stream 225 may be rendered and displayed by the video engine 220 of the interactive zone engine 165.

FIG. 9 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by the device 900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for creating interactive zones in a virtual environment is provided. The system includes a head mounted display device and an interactive zone engine. The interactive zone engine: renders and displays a virtual environment to a wearer of the head mounted display device; captures video data corresponding to a field of view of the wearer of the head mounted display device; detects at least one physical object in the captured video data; creates an interactive zone in the virtual environment based on the detected at least one physical object; generates a video stream for the interactive zone from the captured video data; and renders and displays the generated video stream in the created interactive zone in the virtual environment.

Implementations may include some or all of the following features. The at least one physical object is associated with a location in the field of view of the wearer of the head mounted display device, and the interactive zone engine further creates the interactive zone at a location in the virtual environment based on the location of the at least one physical object in the field of view of the wearer of the head mounted display device. The interactive zone engine further: determines a new location of the physical object in the field of view of the wearer of the head mounted display device; and in response to the determined new location, changes the location of the interactive zone in the virtual environment. The at least one physical object is associated with a location and an orientation, and the interactive zone engine further creates the interactive zone in the virtual environment with an orientation that is based on the location and the orientation of the least one physical object. The interactive zone engine further: determines a new location and a new orientation of the physical object in the field of view of the wearer of the head mounted display device; and in response to the determined new location and new orientation, changes the location and the orientation of the interactive zone in the virtual environment. The interactive zone engine further: detects a physical plane in the captured video data; and renders and displays a virtual plane in the virtual environment based on the detected physical plane. The physical plane is a table or desk. Detecting at least one physical object comprises detecting at least one physical object with a location on the physical plane. The interactive zone engine that creates the interactive zone in the virtual environment based on the detected at least one physical object comprises the interactive zone engine that creates the interactive zone in the virtual environment on the virtual plane. The interactive zone engine further detects a keyboard in the captured video data, and detects the physical plane based on the detected keyboard. The interactive zone engine further renders and displays a representation of the detected keyboard on a location the virtual plane in the virtual environment, and creates the interactive zone in the virtual environment based on the location of the virtual plane. The at least one physical object comprises one or more of a keyboard, a location mouse, a pen, paper, a joystick, a food item, or a beverage item. The video stream of the interactive video includes real time video of the at least one physical object.

In an implementation, a system for creating interactive zones in a virtual environment is provided. The system includes a head mounted display device and an interactive zone engine. The interactive zone engine: renders and displays a virtual environment to a wearer of the head mounted display device; captures video data corresponding to a field of view of the wearer of the head mounted display device; detects a first physical object in the captured video data; based on the detected first physical object in the captured video data, detects a physical plane in the captured video data; based on the detected physical plane, detects a second physical object in the captured video data, wherein the detected second physical object lies on the detected physical plane; renders and displays a virtual plane in the virtual environment based on the detected physical plane; and creates an interactive zone on the virtual plane in the virtual environment, wherein a location of the interactive zone on the virtual plane is based on the first physical object or the second physical object.

Implementations may include some or all of the following features. The interactive zone engine further: generates a video stream for the interactive zone from the captured video data, wherein the video stream for the interactive zone includes real time video of the first physical object or the second physical object; and renders and displays the generated video stream in the created interactive zone in the virtual environment. The first physical object is a reference object. The reference object is a keyboard. The second physical object is one or more of a keyboard, a mouse, a pen, paper, a joystick, a food item, or a beverage item. The interactive zone engine further: determines that the second physical object no longer lies on the physical plane; and in response to the determination, removes the interactive zone from the virtual environment.

In an implementation, a method for creating interactive zones in a virtual environment is provided. The method includes: rendering and displaying a virtual environment to a wearer by a head mounted display device; capturing video data corresponding to a field of view of the wearer by the head mounted display device; receiving an indication to create an interactive zone by the head mounted display device; in response to the indication, creating the interactive zone in the virtual environment by the head mounted display device, wherein the interactive zone is associated with a location in the virtual environment; generating a video stream for the interactive zone from the captured video data by the head mounted display device, wherein the video stream for the interactive zone includes real time video from a location in the field of view that corresponds to the location associated with the interactive zone; and rendering and displaying the generated video stream in the created interactive zone in the virtual environment by the head mounted display device.

Implementation may have some or all of the following features. The method may include: detecting a reference physical object in the captured video data; and in response to the detection of the reference physical object, creating the interactive zone in the virtual environment, wherein the location associated with the interactive zone is based on a location associated with the reference physical object in the field of view. The reference physical object may be a keyboard. The method may include: determining a new location associated with the reference physical object in the captured video data; and in response to the determined new location, changing the location associated with the interactive zone in the virtual environment. The method may further include: detecting that the reference physical object has been removed from the captured video data; and in response to detecting that the reference physical object has been removed, removing the interactive zone from the virtual environment.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for creating interactive zones in a virtual environment, the system comprising:
   a head mounted display device; and
   an interactive zone engine that:
   renders and displays the virtual environment to a wearer of the head mounted display device;
   captures video data of a real world environment corresponding to a field of view of the wearer of the head mounted display device;
   detects at least one physical object in the captured video data at a physical location in the field of view of the wearer;
   creates an interactive zone in the virtual environment at a virtual location in the virtual environment that is spatially locked to the physical location of the detected at least one physical object;
   generates a video stream for the interactive zone from the captured video data; and
   renders and displays the video stream generated from the captured video data of the real world environment within and bounded by the interactive zone in the virtual environment.

2. The system of claim 1, wherein the interactive zone engine further:
   determines a new location of the physical object in the field of view of the wearer of the head mounted display device; and
   in response to the determined new location, changes the virtual location of the interactive zone in the virtual environment.

3. The system of claim 1, wherein the interactive zone engine further:
   detects a physical plane in the captured video data; and
   renders and displays a virtual plane in the virtual environment based on the detected physical plane.

4. The system of claim 3, wherein the physical plane is a table or a desk.

5. The system of claim 3, wherein detecting at least one physical object comprises detecting at least one physical object with the physical location on the physical plane.

6. The system of claim 3, wherein the interactive zone engine further:
   detects a keyboard in the captured video data; and
   detects the physical plane based on the detected keyboard.

7. The system of claim 6, wherein the interactive zone engine further:
   renders and displays a representation of the detected keyboard at a virtual location on the virtual plane in the virtual environment; and
   creates the interactive zone in the virtual environment based on a location of the virtual plane.

8. The system of claim 1, wherein the at least one physical object comprises one or more of a keyboard, a mouse, a pen, paper, a joystick, a food item, or a beverage item.

9. The system of claim 1, wherein the video stream is a portion of the video data containing the physical location in the field of view of the wearer that corresponds to the virtual location of the interactive zone in the virtual environment.

10. A system for creating interactive zones in a virtual environment, the system comprising:
    a head mounted display device; and
    an interactive zone engine that:
    renders and displays the virtual environment to a wearer of the head mounted display device;
    captures video data of a real world environment corresponding to a field of view of the wearer of the head mounted display device;
    detects a first physical object in the captured video data at a physical location in the field of view of the wearer;
    based on the detected first physical object in the captured video data, detects a physical plane in the captured video data;
    based on the detected physical plane, detects a second physical object in the captured video data, wherein the detected second physical object lies on the detected physical plane;
    renders and displays a virtual plane in the virtual environment based on the detected physical plane in the real world environment;
    creates an interactive zone on the virtual plane in the virtual environment at a virtual location in the virtual environment;

generates a video stream for the interactive zone from the captured video data that includes real time video of the first physical object or the second physical object; and renders and displays the video stream generated from the captured video data of the real world environment within and bounded by the interactive zone in the virtual environment, wherein the virtual location of the interactive zone on the virtual plane is spatially locked to the physical location of the first physical object or the second physical object.

11. The system of claim 10, wherein the second physical object is one or more of a keyboard, a mouse, a pen, paper, a joystick, a food item, or a beverage item.

12. The system of claim 10, wherein the interactive zone engine further:

determines that the second physical object no longer lies on the physical plane; and in response to the determination, removes the interactive zone from the virtual environment.

13. A method for creating interactive zones in a virtual environment, the method comprising:

rendering and displaying the virtual environment to a wearer by a head mounted display device;

capturing video data of a real world environment corresponding to a field of view of the wearer by the head mounted display device;

detecting a reference physical object in the captured video data at a physical location in the field of view of the wearer;

receiving an indication to create an interactive zone by the head mounted display device;

in response to the indication, creating the interactive zone in the virtual environment at a virtual location in the virtual environment that is spatially locked to the physical location of the detected reference physical object;

generating a video stream for the interactive zone from the captured video data by the head mounted display device;

the video stream for the interactive zone includes real time video of the physical location in the field of view that corresponds to the virtual location associated with the interactive zone; and rendering and displaying the video stream generated from the captured video data of the real world environment within and bounded by the interactive zone in the virtual environment by the head mounted display device.

14. The method of claim 13, wherein the reference physical object is a keyboard.

15. The method of claim 13, further comprising:

determining a new location associated with the reference physical object in the captured video data; and in response to the determined new location, changing the virtual location associated with the interactive zone in the virtual environment.

16. The method of claim 13, further comprising:

detecting that the reference physical object has been removed from the captured video data; and in response to detecting that the reference physical object has been removed, removing the interactive zone from the virtual environment.

17. The method of claim 13, wherein the video stream is a portion of the captured video data containing the physical location in the field of view of the wearer that corresponds to the virtual location of the interactive zone in the virtual environment.

* * * * *